(12) United States Patent
Cromer et al.

(10) Patent No.: US 8,013,804 B2
(45) Date of Patent: Sep. 6, 2011

(54) SYSTEM AND METHOD FOR GRAPHICS REMAPPING IN HYPERVISOR

(75) Inventors: Daryl Carvis Cromer, Cary, NC (US); Howard Jeffrey Locker, Cary, NC (US); Randall Scott Springfield, Chapel Hill, NC (US); Jennifer Greenwood Zawacki, Hillsborough, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1133 days.

(21) Appl. No.: 11/755,130

(22) Filed: May 30, 2007

(65) Prior Publication Data

US 2008/0301675 A1 Dec. 4, 2008

(51) Int. Cl.
G09G 5/00 (2006.01)

(52) U.S. Cl. ............ 345/1.1; 345/2.1; 345/3.1

(58) Field of Classification Search ........... 345/1.1, 345/2.1, 501, 649, 506, 1.3, 530, 100; 463/31; 718/1, 104, 100, 105; 709/218, 204; 710/72; 713/2; 725/109
See application file for complete search history.

(56) References Cited

U.S. PATENT DOCUMENTS

| | | | | |
|---|---|---|---|---|
| 4,787,026 | A * | 11/1988 | Barnes et al. | 718/100 |
| 5,513,365 | A * | 4/1996 | Cook et al. | 710/72 |
| 7,610,464 | B2 * | 10/2009 | Otsuka | 711/163 |
| 7,777,691 | B1 * | 8/2010 | Nimmer et al. | 345/1.3 |
| 2004/0080482 | A1 * | 4/2004 | Magendanz et al. | 345/100 |
| 2006/0146057 | A1 * | 7/2006 | Blythe | 345/506 |
| 2006/0167997 | A1 * | 7/2006 | Forstadius | 709/204 |
| 2007/0008324 | A1 * | 1/2007 | Green | 345/501 |
| 2007/0198656 | A1 * | 8/2007 | Mazzaferri et al. | 709/218 |
| 2007/0220246 | A1 * | 9/2007 | Powell et al. | 713/2 |
| 2008/0088636 | A1 * | 4/2008 | Ho | 345/530 |
| 2008/0125219 | A1 * | 5/2008 | Williams et al. | 463/31 |
| 2008/0163239 | A1 * | 7/2008 | Sugumar et al. | 718/105 |
| 2008/0201751 | A1 * | 8/2008 | Ahmed et al. | 725/109 |

OTHER PUBLICATIONS

USPGPUB 2008/0201751 claims CIP of U.S. Appl. No. 11/911,785 claiming priority PCT/US06/14559 filed on Apr. 18, 2006, claims priority of U.S. Appl. No. 60/673,431, filed Apr. 18, 2005. 371 U.S. Appl. No. 11/911,785's Drawing and disclosures are attached for applicant's reference.*

U.S Appl. No. 11/911,785— document submitted with 371 application for the PCT/US06/14559 as requested by applicant.*

* cited by examiner

Primary Examiner — Prabodh Dharia
(74) Attorney, Agent, or Firm — John L. Rogitz

(57) ABSTRACT

A hypervisor operating system instantiates a virtual video driver to a main operating system that supports only one type of graphics adapter. The virtual driver handles graphics remapping among plural different display drivers associated with plural different display monitors to enable a computer to output data on multiple different monitors even though the main O.S. supports only one type of display driver.

18 Claims, 2 Drawing Sheets

SYSTEM AND METHOD FOR GRAPHICS REMAPPING IN HYPERVISOR

I. FIELD OF THE INVENTION

The present invention relates generally to systems and methods for graphics remapping using hypervisors.

II. BACKGROUND OF THE INVENTION

Often users wish to electronically link their personal computer to multiple display monitors instead of a single monitor. This allows images to be presented on either a larger display or multiple displays, and can also create the appearance of having more "desktop" room. However, representing data on multiple displays that respectively use graphics adapters made by different respective vendors may not be possible on some operating systems, such as Windows Vista (a trademark of Microsoft Corp.), that do not possess the ability to accommodate multiple different graphics adapters. Different graphics adapters vary and may use different specifications, such as different "refresh rates," which determine the number of times per second that a displayed image is regenerated.

As understood herein, when an operating system does not possess the capability to send data through multiple graphics adapters made by different vendors, either (1) an additional operating system designed to accommodate multiple displays is required or (2) a supplemental remedy installed by the personal computers vendor which allows a single vendor-modified driver to control multiple graphics adapted outputs is required.

Thus, when an operating system does not possess the capability to accommodate multiple displays, it may result in unexpected hardship for the user. Also, it may be unforeseen at the time of purchasing a personal computer that the user may later wish to employ the use of multiple displays. If not foreseen, the vendor of the personal computer may not include a supplemental remedy as stated above. Should such a circumstance occur, the user would be left without a solution for displaying data on multiple displays. The present invention provides software to be implemented in addition to a main operating system that will allow a user to display data on multiple displays using graphics adapters made by different vendors.

SUMMARY OF THE INVENTION

A hypervisor operating system implemented on a computer-readable medium can be executed by a digital processor to present to a main operating system a single virtual video driver. The hypervisor receives demanded display data from the main operating system representative of pixels and sends first pixels to a first video driver associated with a first video display and also sends second pixels to a second video driver associated with a second video display.

In some implementations the hypervisor operating system acquires one or more specifications from both of first and second graphics adapters respectively associated with the first and second displays. The specifications can be display resolutions and/or refresh rates or other parameters. In any case, the hypervisor operating system can use the specifications to generate a list of available specifications for provision thereof to the main operating system.

Also, the hypervisor operating system can query the main operating system for video monitor resolutions and/or desktop options supported by the main operating system. The desktop options can include mirroring, spanning, or cloning.

In another aspects a computer system includes a processor and at least two displays configured to display data demanded by a main operating system executable by the processor. The system also includes a computer readable medium bearing a hypervisor operating system executable by the processor to present to the main operating system one and only one display driver for receiving data from the main operating system and distributing the data to at least first and second display drivers transparently to the main operating system.

In yet another aspect, a method for presenting pixels demanded by a main operating system on at least first and second displays associated with respective first and second graphics adapters includes presenting one and only one virtual display driver to the main operating system. The method also includes distributing pixel data sent to the virtual display driver to the first and second graphics adapters.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
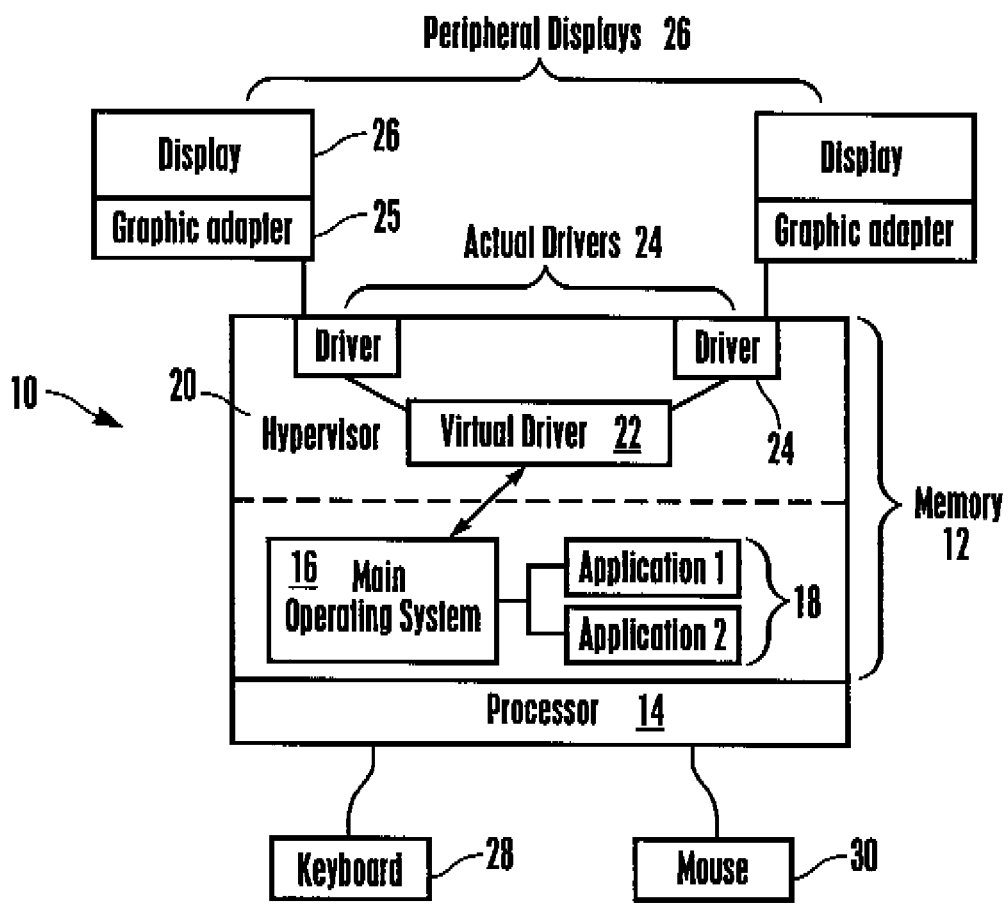
FIG. 1 is a block diagram of a non-limiting system in accordance with present principles.

Referring initially to FIG. 1, a personal computer 10 is shown which contains a memory 12 that is used for data storage and may include non-volatile memory such as flash memory and/or volatile memory such as random access memory (RAM). The personal computer 10 also includes a processor 14, which may be, without limitation, a PowerPC® processor available from Lenovo Corporation (or other processors common to the industry) and includes the capability to execute logic, including the logic set forth in FIG. 2.

After booting from a lard drive in accordance with principles known in the art, the memory 12 also contains a main operating system 16, which may manage plural applications 18. The main operating system 16 may be, without limitation, Windows Vista (or other operating systems common to the industry).

In accordance with present principles, the main operating system 16 communicates with a hypervisor 20 that may also be stored in or booted to memory. Although only a single main O.S. 16 is shown, the preferred hypervisor 20 is capable of managing multiple operating systems on the personal computer 10 simultaneously. Moreover, the hypervisor 20 allows plural operating systems to execute functions jointly.

As shown in FIG. 1, the hypervisor 20 can instantiate a single virtual driver 22 that can communicate with plural software-implemented display drivers 24. A display driver 24 is provided for each of plural graphics adapters 25 that are associated with respective computer displays 26. The adapters 25, which may be implemented as graphics cards, can be directly attached to the computer or attached through a docking station. Each adapter 25 may have more than a single display 26 attached to it. In any case, it is to be understood that the adapters 25 shown in FIG. 1 are differently configured from each other, i.e., they are not duplicates of the same adapter.

A keyboard 28, pointing device 30, and/or other input devices are also typically included with the computer.

Figure 2:
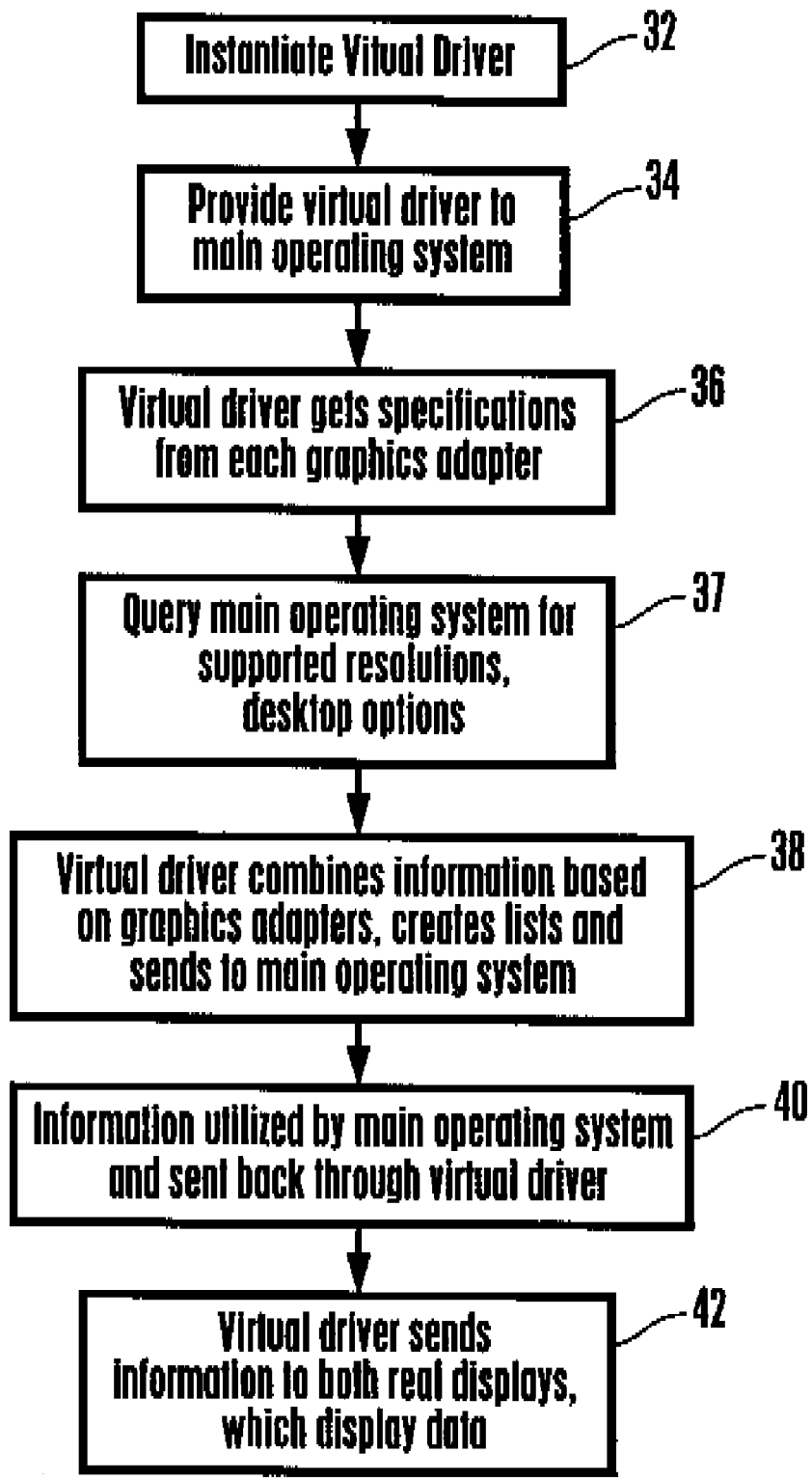
FIG. 2 is a flow chart of non-limiting logic in accordance with present principles.

Moving to FIG. 2, the logic for representing data on multiple displays with different actual drivers is shown. Beginning at block 32, the logic instantiates the virtual driver 22. Once the virtual driver 22 is evident on the hypervisor 20, the virtual driver 22 is presented to the main operating system 16 at block 34. The main operating system 16 regards the virtual driver 22 as the only graphics driver with which communication is held by the main O.S. 16.

At block 36 the virtual driver 22 acquires particular specifications from each graphics adapter 25 using any format for communication between the personal computer 10 and the peripheral displays 26, one example being Display Data Channel (DDC) plug and play. One common specification that may be acquired by the virtual driver 22 is the resolution of each peripheral display 26. The resolution of each peripheral display 26 indicates the number of pixels per square inch that may be generated on that particular display. The virtual driver 22 also may acquire from each adapter 25 the refresh rate of the associated display 26.

In addition, at block 37 the hypervisor 20 queries the main O.S. 16 for the video monitor resolutions and/or desktop options that the main O.S. 16 supports. To illustrate, some display options include, but are not limited to, "mirroring" (where the same image is displayed on all peripheral displays 26), "spanning" (where a single display is spread across multiple peripheral displays 26), and "cloning" (where the same images is displayed on all peripheral displays 26, but with different resolutions being used for each peripheral display 26).

Moving from block 37 to block 38, the virtual driver 22 combines the different specifications of each actual driver 24, creates a list of available specifications that match the desktop options and resolutions provided by the main operating system at block 37, and sends this information to the main operating system 16 when, e.g., a DDC or other resolution support query is issued. If the main O.S. supports only a single unified display, the lowest refresh rate and lowest resolution from the displays 26 are used.

Accordingly, at block 40 one or more of the specifications can be selected by the main operating system 16 to generate either a single unified display or an "extended desktop" across multiple displays, depending on which capability the main operating system 16 possesses. In cases of a single unified display, the main operating system 16 believes it is generating data that is to be displayed on a single display. The main operating system 16 generates demanded display data using the lowest refresh rate of all displays connected to the personal computer 10. Alternatively, in situations where the main operating system 16 utilizes the format of an "extended desktop" used across two displays, the main operating system 16 transmits demanded display data intended to be displayed on multiple displays, but in any case the main O.S. 16 believes that it is sending the data to a single driver, i.e., the virtual driver 22, which is presented to the main operating system as being a driver for a single display possessing the specifications selected by the main operating system at block 40. Thus, it is to be understood that the steps shown in FIG. 2 need not be executed in the order shown, e.g., step 34 can occur after step 40.

At block 42, the virtual driver 22 receives the demanded display data from the main O.S. 16 and then in effect demultiplexes the data, sending portions of the demanded data representing a first group of pixels to one display driver 24 and other portions of the demanded display data representing other pixels to the other display driver(s) 24, for display of the data on the respective displays 26. In mapping which pixel is sent to which driver 24, the virtual driver 22 of the hypervisor 20 simply maps each pixel to its corresponding display using the position of the pixel in the demanded display data and the corresponding combined resolution of the aggregate displays 26.

The tables below provide examples to illustrate the above description of the hypervisor 20 with virtual driver 22, which can be stored on computer-readable media such as solid state memory and disk-based memory for execution by a digital processor.

The below example is broken down into monitors, graphics adapters, and combined graphics resolutions. Each graphics adapter can attach to one monitor, reporting back to the hypervisor 20 the supported resolutions. For example, consider a system that has two graphics adapters 25 attached, with the following example resolutions being sent to the hypervisor 20 at block 36 of FIG. 2:

Monitor 1→Graphics Adapter 1 Resolutions
640×480
800×600
1024×768
Monitor 2→Graphics Adapter 2 Resolutions
640×480
800×600
1024×768
1280×1024

The virtual graphics driver 22 combines, at block 38, the above resolutions into larger offerings, depending on the capabilities reported by the main O.S. 16 at block 37. Assuming the main O.S. 16 supports wide desktop resolutions, the virtual driver 22 passes through to the main O.S. 16 the following supported resolutions, using the below table to map the pixels represented by the demanded display data to the plural displays 26:

Main OS 1 Resolutions
640×480 (Monitor 1)
640×480 (Monitor 2)
640×480 (Mirrored)
800×600 (Monitor 1)
800×600 (Monitor 2)
800×600 (Mirrored)
1024×768 (Monitor 1)
1024×768 (Monitor 2)
800×600 (Mirrored)
1240×480 (Spans both monitors)
1280×1024 (Monitor 2)
1600×600 (Spans both monitors)
2048×768 (Spans both monitors)

To further illustrate the mapping, in non-limiting implementations the mapping can be done similarly to the way graphics adapters currently map pixels, with the hypervisor providing the translation from the oversize location to the physical card's supported location. The operating system can have a screen region for each object (i.e., an XY coordinate for a corner pixel). Based on the information from the multiple graphics adapters, the hypervisor can remap the information from the extended region to the narrower region covered by the display adapter. For example:

Adapter 1: 800×600
Adapter 2: 800×600
Virtual adapter: 1600×600

In the above example the operating system can make a call for an object at pixel location 1000×300, and then in response the hypervisor virtual adapter remaps the information to be output to "adapter 2" at pixel location 200×300.

While the particular SYSTEM AND METHOD FOR GRAPHICS REMAPPING IN HYPERVISOR is herein shown and described in detail, it is to be understood that the subject matter which is encompassed by the present invention is limited only by the claims.

What is claimed is:

1. A hypervisor operating system implemented on a computer-readable medium for execution by a digital processor to:
   present to a main operating system a single virtual video driver;
   receive demanded display data from the main operating system representative of pixels; and
   send first pixels to a first video driver associated with a first video display and send second pixels to a second video driver associated with a second video display, wherein the hypervisor operating system queries the main operating system for video monitor resolutions and/or desktop options supported by the main operating system, wherein the desktop options include one or more of mirroring, spanning, or cloning.

2. The hypervisor operating system of claim 1, wherein the hypervisor operating system acquires at least one specification from both of first and second graphics adapters respectively associated with the first and second displays.

3. The hypervisor operating system of claim 2, wherein the specification is a display resolution.

4. The hypervisor operating system of claim 2, wherein the specification is a display refresh rate.

5. The hypervisor operating system of claim 2, wherein the hypervisor operating system uses the specifications to generate a list of available specifications for provision thereof to the main operating system.

6. A computer system comprising:
   at least one processor;
   at least two displays configured to display data demanded by a main operating system executable by the processor; and
   at least one computer readable medium bearing a hypervisor operating system executable by the processor to present to the main operating system one and only one display driver for receiving data from the main operating system and distributing the data to at least first and second display drivers transparently to the main operating system.

7. The system of claim 6, wherein the hypervisor operating system acquires at least one specification from both of first and second graphics adapters respectively associated with first and second displays.

8. The system of claim 7, wherein the specification is a display resolution.

9. The system of claim 7, wherein the specification is a display refresh rate.

10. The system of claim 7, wherein the hypervisor operating system uses the specifications to generate a list of available specifications for provision thereof to the main operating system.

11. The system of claim 7, wherein the hypervisor operating system queries the main operating system for video monitor resolutions and/or desktop options supported by the main operating system.

12. The system of claim 11, wherein the desktop options include one or more of mirroring, spanning, or cloning.

13. A method for presenting pixels demanded by a main operating system on at least first and second displays associated with respective first and second graphics adapters, comprising:
   presenting one and only one virtual display driver on a hypervisor operating system to the main operating system; and
   distributing pixel data sent to the virtual display driver to the first and second graphics adapters.

14. The method of claim 13, comprising acquiring at least one specification from both of the first and second graphics adapters.

15. The method of claim 14, wherein the specification is a display resolution.

16. The method of claim 14, wherein the specification is a display refresh rate.

17. The method of claim 14, comprising querying the main operating system for video monitor resolutions and/or desktop options supported by the main operating system.

18. The method of claim 17, wherein the desktop options include one or more of mirroring, spanning, or cloning.

* * * * *